(12) United States Patent
Khaira et al.

(10) Patent No.: US 12,713,335 B2
(45) Date of Patent: Aug. 18, 2026

(54) FLEXIBLE RECONFIGURABLE INTELLIGENT SURFACE WITH MECHANICALLY TUNABLE BEAM SCANNING

(71) Applicant: Dell Products L.P., Round Rock, TX (US)

(72) Inventors: Navjot Kaur Khaira, Kanata (CA); Tejinder Singh, Kanata (CA); Morris Repeta, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 18/523,228

(22) Filed: Nov. 29, 2023

(65) Prior Publication Data

US 2025/0175888 A1 May 29, 2025

(51) Int. Cl.
*H04W 48/16* (2009.01)
*H04W 48/18* (2009.01)

(52) U.S. Cl.
CPC .......... *H04W 48/16* (2013.01); *H04W 48/18* (2013.01)

(58) Field of Classification Search
CPC .... H04W 48/16; H04W 48/18; H01Q 15/148; H01Q 3/14; H01Q 3/44
See application file for complete search history.

(56) References Cited

U.S. PATENT DOCUMENTS 4,829,271 A 5/1989 Pitschi et al.
9,923,267 B1 3/2018 Pala et al.
10,833,404 B1 * 11/2020 Kaddour ............ H01Q 15/0066
11,133,588 B1 9/2021 Matos et al.
12,117,517 B1 * 10/2024 Lerosey ............... H01Q 21/064
2007/0182639 A1 8/2007 Sievenpiper et al.
2008/0024368 A1 1/2008 Chang et al.
2016/0294054 A1 10/2016 Behdad et al.
2021/0143555 A1 * 5/2021 Akselrod ........... H01Q 15/0053
2022/0278740 A1 * 9/2022 Shahvirdi Dizaj Yekan ............... H01Q 3/46
2023/0352834 A1 11/2023 Gupta et al.
2024/0072452 A1 * 2/2024 Taravati ................... H01Q 3/44
(Continued)

FOREIGN PATENT DOCUMENTS

CN 115020987 A 9/2022
CN 115302906 A 11/2022
(Continued)

OTHER PUBLICATIONS

"Programmable terahertz chip-scale sensing interface with direct digital reconfiguration at sub-wavelength scales" (Year: 2019).
(Continued)

*Primary Examiner* — Khawar Iqbal
(74) *Attorney, Agent, or Firm* — Workman Nydegger

(57) ABSTRACT

A device for selectively reflecting signals is disclosed. The device may include a flexible reconfigurable intelligent substrate. Different portions or segments of the reconfigurable intelligent substrate can be exposed in an illumination window. Each of the segments has a different phase response. Positioning a particular segment in the illumination window achieves a particular reflection direction. The reflection direction can be tuned manually using a tuning mechanism configured to reposition the reconfigurable intelligent substrate relative to the illumination window.

20 Claims, 14 Drawing Sheets

(56) References Cited

U.S. PATENT DOCUMENTS

| | | | | |
|---|---|---|---|---|
| 2024/0079792 | A1* | 3/2024 | Hong | H01Q 3/44 |
| 2024/0243473 | A1* | 7/2024 | Lee | H01Q 9/0414 |
| 2024/0339754 | A1* | 10/2024 | Tam | H01Q 3/34 |
| 2025/0097754 | A1* | 3/2025 | Li | H04W 64/00 |
| 2025/0309943 | A1* | 10/2025 | Elshafie | G06K 7/10366 |
| 2026/0074842 | A1* | 3/2026 | Na | H04L 5/001 |

FOREIGN PATENT DOCUMENTS

| | | | | |
|---|---|---|---|---|
| CN | 116470296 | A | 7/2023 | |
| CN | 116567860 | A | 8/2023 | |
| KR | 10-2018-0076359 | A | 7/2018 | |
| WO | WO-2022253534 | A1 * | 12/2022 | H01Q 3/46 |

OTHER PUBLICATIONS

Agrawal et al., Finite Block Length Analysis of RIS-Assisted UAV-Based Multiuser IoT Communication System With Non-Linear EH, May 1, 2022, IEEE Transactions on Communications, 3542-3557, 70/5.

Amri, et al., "A Programmable Binary Metasurface for Wireless Power Transfer Application," 2020 IEEE Wireless Power Transfer Conference (WPTC), Seoul, Korea (South), Nov. 2020.

Bahl et al., Amorphous versus crystalline GeTe films. III. Electrical properties and band structure, Apr. 1, 1970, J. Appl. Phys., 2196-2212, 41/5.

Baladi et al., Dual-Band Circularly Polarized Fully Reconfigurable Reflectarray Antenna for Satellite Applications in the Ku-Band, Dec. 1, 2021, IEEE Transactions of Antennas and Propagation, 8387-8396, 69/12.

Basharat et al., Reconfigurable Intelligent Surfaces: Potentials, Applications, and Challenges for 6G Wireless Networks, Jul. 12, 2021, IEEE Wireless Commun., 184-191, 28/6.

C. Guclu, J. Perruisseau-Carrier et al., "Proof of concept of a dual-band circularly-polarized RF MEMS beam-switching reflectarray," IEEE Transactions on Antennas and Propagation, vol. 60, No. 11, pp. 5451-5455, Nov. 2012.

Chen et al., "Ultra-wideband/short-pulse radar for target identification and detection-laboratory study," Proc. International Radar Conference, Alexandria, VA, USA, 1995.

Chen et al., Reconfigurable Intelligent Surfaces for 6G IoT Wireless Positioning: A Contemporary Survey, Dec. 1, 2022, IEEE Internet of Things J., 23570-23582, 9/23.

D. F. Sievenpiper, J. H. Schaffner et al., "Two-dimensional beam steering using an electrically tunable impedance surface," IEEE Transactions on Antennas and Propagation, vol. 51, No. 10, pp. 2713-2722, Oct. 2003.

Dai et al., Reconfigurable Intelligent Surface-Based Wireless Communications: Antenna Design, Prototyping, and Experimental Results, Dec. 8, 2019, IEEE Access, 45913-45923, 8.

Dash et al., Active Control of THz Waves in Wireless Environments Using Graphene-Based RIS, Oct. 1, 2022, IEEE Transactions on Antennas and Propagation, 8785-8797, 70/10.

Gidlund, T. Lennvall and J. Akerberg, "Will 5G become yet another wireless technology for industrial automation?," in IEEE International Conference on Industrial Technology (ICIT), pp. 1319-1324, Toronto, Canada, 2017.

Haake et al., "Problems caused by insufficient electrical isolation in RF-measurement setups," 2005 International Symposium on Electromagnetic Compatibility (EMC 2005)., Chicago, IL, USA, 2005, pp. 256-261 Vol. 1, doi: 10.1109/ISEMC.2005.1513510.

Huang et al., Reconfigurable metasurface for multifunctional control of electromagnetic waves, Sep. 29, 2017, Advanced Optical Materials, 5/22.

Huang et al., The state-of-the-art of RF capacitive tunable components (Invited), Nov. 1, 2010, 2010 10th IEEE International Conference on Solid-State and Integrated Circuit Technology, Shanghai, China, 619-622.

J.-B. Gros, V. Popov et al., "A Reconfigurable Intelligent Surface at mmWave Based on a Binary Phase Tunable Metasurface," IEEE Open Journal of the Communications Society, vol. 2, pp. 1055-1064, 2021.

Jia et al., Beam Scanning for Dual-Polarized Antenna With Active Reflection Metasurface, May 20, 2022, IEEE Antennas and Wireless Propagation Letters, 1722-1726, 21/9.

Kaina et al., Shaping complex microwave fields in reverberating media with binary tunable metasurfaces, Oct. 21, 2014, Scientific Reports, 1-7, 4.

Kim et al., Independently Polarization Manipulable Liquid-Crystal-Based Reflective Metasurface for 5G Reflectarray and Reconfigurable Intelligent Surface, Jun. 1, 2023, IEEE Transactions on Antennas and Propagation.

M. Di Renzo, A. Zappone et al., "Smart Radio Environments Empowered by Reconfigurable Intelligent Surfaces: How it Works, State of Research, and The Road Ahead," IEEE Journal on Selected Areas in Communications, vol. 38, No. 11, pp. 2450-2525, Nov. 2020.

M. F. Jager, C. Ott, P. M. Kraus et al., "Tracking the insulator-to-metal phase transition in VO2 with few-femtosecond extreme UV transient absorption spectroscopy," in Proceedings of the National Academy of Sciences, vol. 114, No. 36, pp. 9558-9563, Sep. 2017.

M. Ojaroudi and V. Loscri, "Graphene-Based Reconfigurable Intelligent Meta-Surface Structure for THz Communications," 15th European Conference on Antennas and Propagation (EUCAP), pp. 1-5, Germany 2021.

M. Poulakis, "Metamaterials Could Solve One of 6G's Big Problems [Industry View]," in Proceedings of the IEEE, vol. 110, No. 9, pp. 1151-1158, Sep. 2022.

Momeni et al., K/Ka-Band Full-Duplex Satcom ESA Using a Varactor-Based Metasurface Aperture, Mar. 26, 2023, 2023 17th European Conference on Antennas and Propagation (EuCAP), Florence, Italy, 1-4.

Nardone et al., Electrical conduction in chalcogenide glasses of phase change memory, Oct. 1, 2012, J. Appl. Phys., 112/071101.

Ovshinsky, S. R., Reversible electrical switching phenomena in disordered structures, Nov. 11, 1968, Phys. Rev. Lett., 1450-1453, 21/20.

PI (Physik Instruments) L.P., PI P-088 Round PICMA Stack Multilayer Piezo Actuator, https://www.pi-usa.us/en/products/piezo-actuators-stacks-benders-tubes/p-088-round-picma-stack-multilayer-piezo-actuator-100821, Aug. 1, 2023.

PI (Physik Instruments) L.P., PI P-216 PICA Power Piezo Actuators, https://www.pi-usa.us/en/products/piezo-actuators-stacks-benders-tubes/p-216-pica-power-piezo-actuator-101555, Aug. 1, 2023.

Q. Hu, X. Zeng et al., "Design of a Novel 2-bit Wideband Beam-Scanning Reconfigurable Intelligent Surface," IEEE International Workshop on Electromagnetics: Applications and Student Innovation Competition (iWEM), pp. 1-3, China 2021.

Qiu et al., Flexible Controls of Radar Cross Section based on Coding Metasurface with Varactors, Jul. 18, 2019, 2019 Cross Strait Quad-Regional Radio Science and Wireless Technology Conference (CSQRWC), Taiyuan, China, 1-2.

Quevedo-Teruel et al., Roadmap on metasurfaces, Jul. 1, 2019, Journal of Optics, 073002, 21/7.

Rahman et al., White Paper: 5G Advanced: Evolution towards 6G, Jun. 1, 2023, BNEW-22:024836 Uen, https://www.ericsson.com/en/reports-and-papers/white-papers/5g-advanced-evolution-towards-6g.

S. Rangan, T. S. Rappaport et al., "Millimeter-Wave Cellular Wireless Networks: Potentials and Challenges," Proceedings of the IEEE, vol. 102, No. 3, pp. 366-385, Mar. 2014.

Schmitt et al., Design and Fabrication of MEMS Reflectors for THz Reflect-Arrays, Jul. 5, 2021, Fourth International Workshop on Mobile Terahertz Systems (IWMTS), 1-5.

Singh et al., Experimental Investigation of Performance, Reliability, and Cycle Endurance of Nonvolatile DC-67 GHz Phase-Change RF Switches, Nov. 1, 2021, IEEE Transactions on Microwave Theory and Techniques, 4697-4710, 69/11.

Singh, et al., "Recent Advancements in Reconfigurable mmWave Devices Based on Phase-Change and Metal Insulator Transition Materials," IEEE J. Microw., vol. 3, No. 2, pp. 827-851, Apr. 2023.

(56) References Cited

OTHER PUBLICATIONS

Skyworks, Data sheet SMV1405 to SMV1430 series: Plastic-packaged Abrupt Junction Tuning Varactors, Jan. 25, 2016, https://www.skyworksinc.com/-/media/SkyWorks/Documents/Products/101-200/SMV1405_1430_Series_200068W.pdf, Jun. 23, 2023.

Skyworks, Data Sheet: SMV1493, SMV1494: Silicon Abrupt Junction Tuning Varactors, Hermetic Ceramic Packaged Devices, https://www.skyworksinc.com/-/media/SkyWorks/Documents/Products/2601-2700/SMV1493_SMV1494_203255C.pdf, Jun. 23, 2023.

Skyworks, Preliminary Data Sheet MV2025 hyperabrupt tuning varactors supplied on film frame and Waffle Packs, Jun. 27, 2013, https://www.skyworksinc.com/-/media/SkyWorks/Documents/Products/1801-1900/SMV2025_202913A.pdf, Jun. 23, 2023.

Subrt et al., Controlling Propagation Environments Using Intelligent Walls, Mar. 1, 2012, 6th European Conference on Antennas and Propagation (EUCAP).

Trivedi et al., Hyperabrupt-junction varactor for mmWave SiGe:C BiCMOS, enabling 77GHz VCO/TX with 13-15GHz tuning range, Oct. 4, 2010, 2010 IEEE Bipolar/BiCMOS Circuits and Technology Meeting (BCTM), Austin, TX, 82-85.

V. Ziegler, H. Viswanathan, H. Flinck et al., "6G Architecture to Connect the Worlds," in IEEE Access, vol. 8, pp. 173508-173520, Sep. 2020.

Viswanathan et al., White Paper: Communications in the 6G Era, Mar. 1, 2020, Nokia Bell Labs.

X. Meng, M. Nekovee and D. Wu, "The Design and Analysis of Electronically Reconfigurable Liquid Crystal-Based Reflectarray Metasurface for 6G Beamforming, Beamsteering, and Beamsplitting," IEEE Access, vol. 9, pp. 155564-155575, 2021.

Zhang, Zhang, Y. Zhang, J. Cosmas et al., "mmWave Indoor Channel Measurement Campaign for 5G New Radio Indoor Broadcasting", in IEEE Transactions on Broadcasting, vol. 68, No. 2, pp. 331-344, Jun. 2022.

International Search Report and Written Opinion received for PCT Patent Application No. PCT/US2024/013793, mailed on Sep. 26, 2024, 19 pages.

Zheng et al., "Uplink Channel Estimation for Double-IRS Assisted Multi-User MIMO", ICC 2021—IEEE International Conference on Communications, 2021, pp. 1-6.

International Search Report and Written Opinion received for PCT Patent Application No. PCT/US24/13824, mailed on Sep. 5, 2024 18 pages.

International Search Report and Written Opinion received for PCT Patent Application No. PCT/US24/13832, mailed on Aug. 16, 2024, 13 pages.

International Search Report and Written Opinion received for PCT Patent Application No. PCT/US24/13690, mailed on Aug. 22, 2024, 14 pages.

International Search Report and Written Opinion received for PCT Patent Application No. PCT/US24/13837, mailed on Aug. 9, 2024, 15 pages.

Karnati et al., "A Monolithically BST-Integrated Ka-Band Beamsteerable Reflectarray Antenna," IEEE Transactions on Antennas and Propagation, vol. 65, No. 1, Nov. 9, 2016, pp. 159-166.

Morgan et al., "Metasurface with reconfigurable reflection phase for high-power microwave applications," IEEE Antennas and Propagation Society International Symposium (APSURSI). IEEE, 2014, pp. 1230-1231.

Rodrigues et al., "Optimized phase shifts in intelligent reflective surfaces for robust radar-based indoor coverage enhancement," Radar Sensor Technology XXVII., vol. 12535, SPIE, 2023.

Singh et al., "Chalcogenide GeTe-based non-volatile switched K-band tunable reflective load for reconfigurable RF circuits," IEEE/MTT-S International Microwave Symposium-IMS 2022. IEEE, 2022, pp. 967-970.

International Search Report and Written Opinion received for PCT Patent Application No. PCT/US24/13685, mailed on Aug. 2, 2024, 16 pages.

Mavridou et al., "Continuously Tunable mm-Wave High Impedance Surface", IEEE Antennas and Wireless Propagation Letters, vol. 15, Apr. 20, 2016, pp. 1390-1393.

Vassos et al., "Design Process of Novel Electro-Mechanically Tuneable Reflectarray Antennas", 2021 51st European Microwave Conference (EUMC), European Microwave Association, Apr. 4, 2022, pp. 155-157.

Mavridou, M., Feresidis, A.P., Gardner, P. and Hall, P.S., 2014. Tunable millimetre-wave phase shifting surfaces using piezoelectric actuators. IET Microwaves, Antennas & Propagation, 8(11), pp. 829-834.

Squeeze-Film Damping of Perforated Plates, Created in COMSOL Multiphysics 5.6 Nov. 11, 2020.

Tsilipakos, 0., Tasolamprou, A.C., Pitilakis, A., Liu, F., Wang, X., Mirmoosa, M.S., Tzarouchis, D.C., Abadal, S., Taghvaee, H., Liaskos, C. and Tsioliaridou, A., 2020. Toward intelligent metasurfaces: the progress from globally tunable metasurfaces to software-defined metasurfaces with an embedded network of cont.

Varittha Sanphuang, Nima Ghalichechian, Niru K. Nahar, John L. Volakis; Equivalent circuit for VO2 phase change material film in reconfigurable frequency selective surfaces. Appl. Phys. Lett. Dec. 21, 2015; 107 (25): 253106. https://doi.org/10.1063/1.4938468 (Year: 2015).

Vassos, E., Churm, J. and Feresidis, A., 2020. Ultra-low-loss tunable piezoelectric-actuated metasurfaces achieving 360° or 180° dynamic phase shift at millimeter-waves. Scientific Reports, 10(1), p. 15679.

* cited by examiner

FLEXIBLE RECONFIGURABLE INTELLIGENT SURFACE WITH MECHANICALLY TUNABLE BEAM SCANNING

FIELD OF THE INVENTION

Embodiments of the present invention generally relate to reconfigurable intelligent surfaces. More particularly, at least some embodiments of the invention relate to systems, hardware, and methods for a reconfigurable intelligent surface with mechanically tunable beam scanning.

BACKGROUND

Today, mobile or cellular networks generally operate using 5G technologies. These networks, however, will need to evolve in order to accommodate ever-growing data and connectivity requirements. A potential solution to this challenge is to use millimeter-wave (mmWave) signals. Signals in these wavelengths or frequencies (e.g., 30 Gigahertz to 300 Gigahertz) hold the potential of meeting gigabits per second data demands and address the issue of spectrum scarcity.

In addition to consumer applications, mmWave technology may facilitate advanced industrial automation, such as autonomous robots and automated guided vehicles within factories, and enrich augmented and virtual reality experiences, such as immersive education and training, digital twin simulations, and advanced retail shopping experiences. Despite the relatively recent initiation of mmWave standardization for mobile access in cellular networks with the introduction of the 3GPP Release 15, the technology has been extensively employed in the realms of satellite links and cellular backhauling.

However, mmWave signals present various challenges. For example, these signals suffer from high free space attenuation, high penetration losses, and other propagation issues intrinsic to high-frequency waves. This suggests that obstructions in the line of sight could disrupt mmWave-based communications. Overcoming signal propagation issues is a challenging problem.

Emerging technologies, such as reconfigurable intelligent surfaces (RISs), have gained prominence as potential solutions to these challenges. Reconfigurable intelligent surfaces are defined as passive planar structures capable of manipulating incident radio waves in various ways. Reconfigurable intelligent surfaces can achieve multiple types of electromagnetic manipulations and their ability to reflect and focus incident waves in different directions presents the potential to transform these surfaces into passive relays with the ability to create alternative electromagnetic wave paths.

In contrast to active relays, reconfigurable intelligent surfaces exhibit superior energy efficiency, and can be constructed from cost-effective materials. This cost reduction in the deployment and maintenance of resilient wireless access networks positions reconfigurable intelligent surfaces as a promising alternative to more traditional, but more expensive, strategies.

However, mmWave signals have range limitations and attempts to use reconfigurable intelligent surfaces face various challenges including the use of on-chip components and the corresponding fabrication requirements. Still, the use of on-chip components such as PIN diodes and varactors have a longstanding role in enabling tunability within the domains of radio frequency and microwave engineering and attempts at creating a reconfigurable intelligent surface using PIN diodes or varactors is thus expected.

However, PIN diodes and varactors possess low maximum operating frequencies and exhibit frequency-dependent traits, such as restricted bandwidth. These characteristics significantly inhibit their applicability within mmWave frequencies. Further, parasitic effects become particularly pronounced at these higher frequencies and prevent optimal performance at these frequencies.

In order to attain beam-steering capabilities for a reflected beam, unit cells necessitate maximum phase tunability. Electronically tunable designs that depend on PIN diodes functioning as switches between metallic patterns provide only limited phase resolution. In fact, given that PIN diodes can offer only two states, the deployment of a single PIN diode within a unit cell permits only two reconfigurable states of phase. Considering that each unit cell of the reconfigurable intelligent surface requires one or multiple PIN diodes or varactors, the implementation of the reconfigurable intelligent surface panel will necessitate the soldering of hundreds or thousands of these devices. This is further complicated by the need for an intricate biasing mechanism to control such a significant number of PIN diodes or varactors.

In another example, graphene is used to achieve reconfigurability in reconfigurable intelligent surfaces. However, the process to produce high-quality, large-area graphene is difficult and often costly, which can limit its scalability for commercial applications. While graphene has excellent mechanical strength, its stability when exposed to certain environmental factors (such as oxygen, moisture, or high temperature) is problematic. Achieving consistent material properties across a large graphene sheet can be challenging. This could lead to uneven performance across a reconfigurable intelligent surface. Graphene's electrical properties can be tuned using an external electric field. However, creating a practical and efficient method for tuning these properties on a large reconfigurable intelligent surface is difficult.

Liquid crystal technology has also been proposed for use with reconfigurable intelligent surfaces due to its tunable refractive index and low power consumption. However, there are several challenges associated with this approach. Liquid crystals can be slow to respond when changing their orientation in response to an applied electric field, which could limit the speed at which the reconfigurable intelligent surface can be configured. Moreover, the operation of liquid crystals is highly sensitive to temperature changes, which can be problematic in environments with significant temperature variations. Additionally, to achieve significant changes in refractive index, a relatively high voltage may be required, which could impact the overall power efficiency of the reconfigurable intelligent surface. Apart from these challenges, maintaining proper alignment of the liquid crystal molecules can be difficult, especially over larger areas. Misalignment can impact the performance of the reconfigurable intelligent surface significantly.

Another approach is to use microelectromechanical systems (MEMS) technology for reconfigurable intelligent surfaces. MEMS can alter the structure of the surface and is therefore a candidate for reconfigurable intelligent surfaces. However, the fabrication of MEMS devices involves complex processes, which can increase the cost and complexity of producing the reconfigurable intelligent surface. Integrating MEMS into a larger system like a reconfigurable intelligent surface may bring difficulties due to potential incompatibilities with other components. Moreover, MEMS devices generally possess slower response times due to the mechanical nature of their operation. This could limit the speed at which the reconfigurable intelligent surface can be reconfigured.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1A:
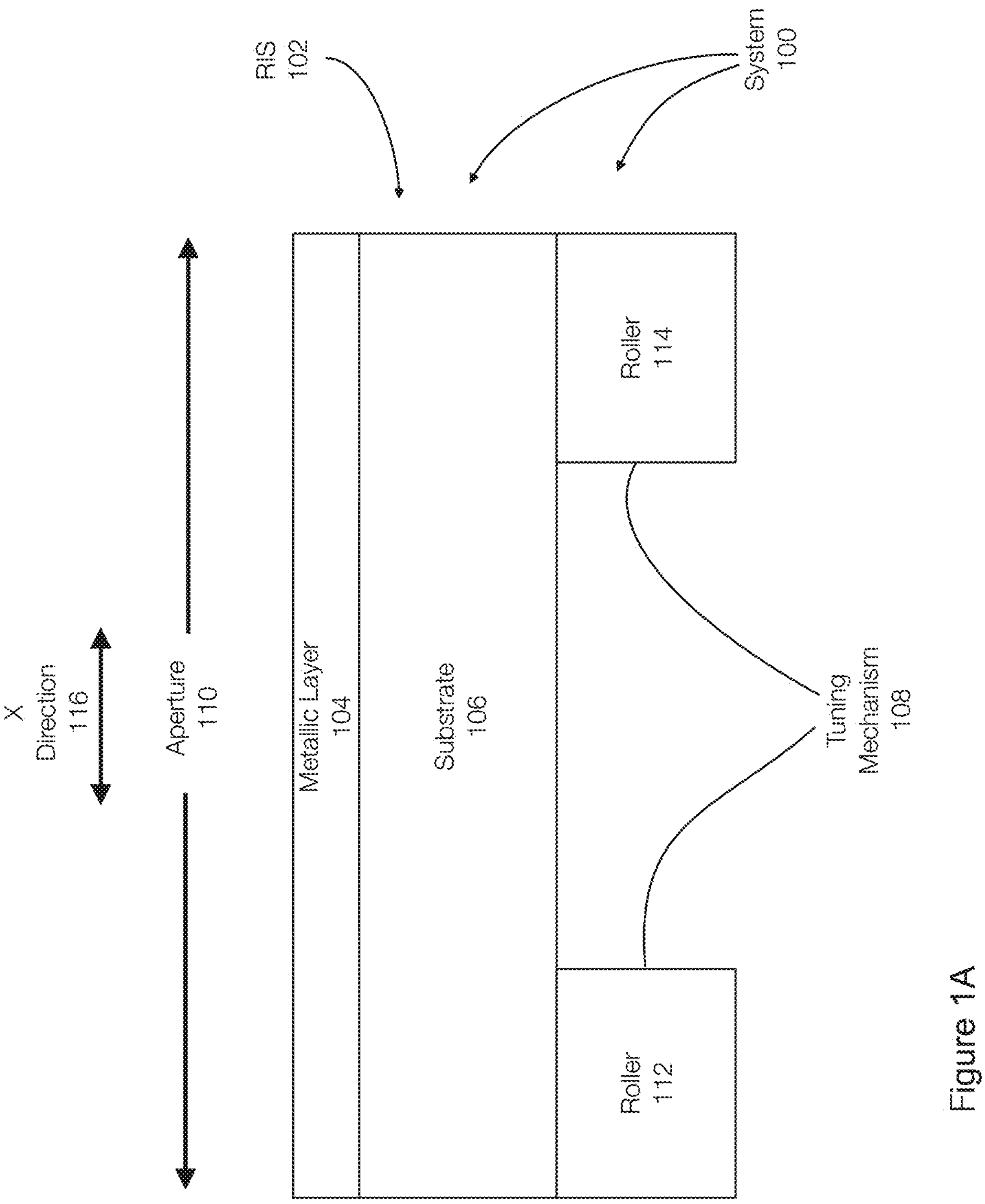
FIG. 1A discloses aspects of a reconfigurable intelligent surface system.

Embodiments of the present invention generally relate to reconfigurable intelligent surfaces. More particularly, at least some embodiments of the invention relate to systems, hardware, software, computer-readable media, and methods for reconfigurable intelligent surface systems that with mechanically tunable beam scanning.

Embodiments of the invention relate to a reconfigurable intelligent surface or a reconfigurable intelligent surface system that includes a tuning mechanism such as a mechanical scrolling system or other mechanism to steer (e.g., reflect) an electromagnetic wave or signal in a desired direction. In one example, the reconfigurable intelligent surface is realized or formed on a flexible substrate which is installed on a rollable or scrollable structure such that the exposed aperture (e.g., portion of the reconfigurable intelligent surface reflecting an incident signal) can be mechanically changed. The direction of the steered or reflected beam can be controlled by rolling or scrolling or otherwise transitioning the system to change the aperture. This may be useful, by way of example, in a situation where the reflected beam direction needs to be changed. For example, the location of an access point may change and the reflected beam direction needs to be changed to account for the new location of the access point.

Embodiments of the invention are discussed in the context of a reconfigurable intelligent surface operating at a mmWave frequency of 30 Gigahertz. Embodiments of the invention are not limited to this frequency but may be configured for operation at other higher and/or lower frequencies including, but not limited to, mmWave frequencies.

In one example, a reconfigurable intelligent surface system (also referred to herein as a panel) may be associated with an aperture. In one example, the aperture is typically smaller than the size of the reconfigurable intelligent surface. The aperture may refer, in one embodiment, to the portion or segment of a reconfigurable intelligent surface that is exposed for receiving incident signals. For example, the reconfigurable intelligent surface as a whole may include an array of 160×160 unit cells that have a metallic pattern of varying sizes that are fabricated on a flexible substrate (e.g., a plastic substrate). The reconfigurable intelligent surface system may include an aperture configured to expose a segment or portion of the surface whose size is 80×80 unit cells. In this example, the aperture of the panel may be 80×80 unit cells.

The panel or system includes wrapping ends of the reconfigurable intelligent surface around cylindrical rollers. The rollers are separated by a distance that may be equal to the size of the aperture or that allows the aperture to be exposed. Beam steering is achieved by mechanically operating the cylindrical rollers to change the portion or segment of the panel exposed in the aperture. Embodiments of the invention mechanically operate the panel to select a specific segment for reflecting incident signals.

In one example, the phase distribution of the reconfigurable intelligent surface is configured for maximal gain before positioning a smaller section or segment in one embodiment. Embodiments of the invention provide high gain beam steering capability, which is accomplished without reliance on intricate feed networks or complex mechanical systems. Embodiments of the invention include a flexible reconfigurable intelligent surface whose ends are wrapped around rotatable cylinders or rollers. This provides a rollable or scrollable aperture. This reconfigurable intelligent surface system includes a low-profile tuning mechanism and circumvents the need for bulky, inefficient feed networks or elaborate mechanical systems.

FIG. 1A discloses aspects of a reconfigurable intelligent surface or reconfigurable intelligent surface system. The system 100 includes a reconfigurable intelligent surface (RIS) 102. In this example, the reconfigurable intelligent surface 102 includes a substrate 106 and a metallic layer 104.

The substrate 106 may be plastic or other suitable material. More specifically, flexible substrates for reconfigurable intelligent surface applications, including mmWave applications, are generally capable of sustaining high-frequency operations, have low dielectric losses, and demonstrate stability under varying environment conditions. Example substrates may include, but are not limited to, Liquid Crystal Polymer (LCP) and Polyimide and Flexible Glass. LCP offers low water absorption, low dielectric constant, low loss tangent, and excellent dimensional stability. Polyimides are advantageous due to their thermal stability, mechanical robustness, and low dielectric constant. However, their higher water absorption may pose challenges at higher frequencies. For applications requiring additional performance, flexible ultra-thin glass can be used, which provides excellent electrical properties and chemical stability. The metallic layer 104 may be copper or other suitable material. In one example, the metallic layer 104 may be printed on the surface of the substrate 106.

The reconfigurable intelligent surface 102 may be coupled or connected to a tuning mechanism 108 that is configured to change the aperture 110. The tuning mechanism 108 may include rollers 112 and 114 and end portions of the reconfigurable intelligent surface 102 are wrapped around the rollers such that the reconfigurable intelligent surface 102 can be moved or scrolled (e.g., in the X direction 116 in FIG. 1A). Rotating the rollers determines which portion or segment of the reconfigurable intelligent surface 102 constitute the aperture 110. Stated differently, the aperture 110 includes the portion or segment of the reconfigurable intelligent surface 102 that is operating to reflect an incident signal or represents the portion or segment of the reconfigurable intelligent surface 102 that is exposed in an illumination window. Changing which portion or segment of the reconfigurable intelligent surface 102 is included in the aperture 110 determines a direction of the reflected beam or signal. Thus, the tuning mechanism 108 is actuated or mechanically operated to steer the reflected beam to a desired reflection direction.

Figure 1B:
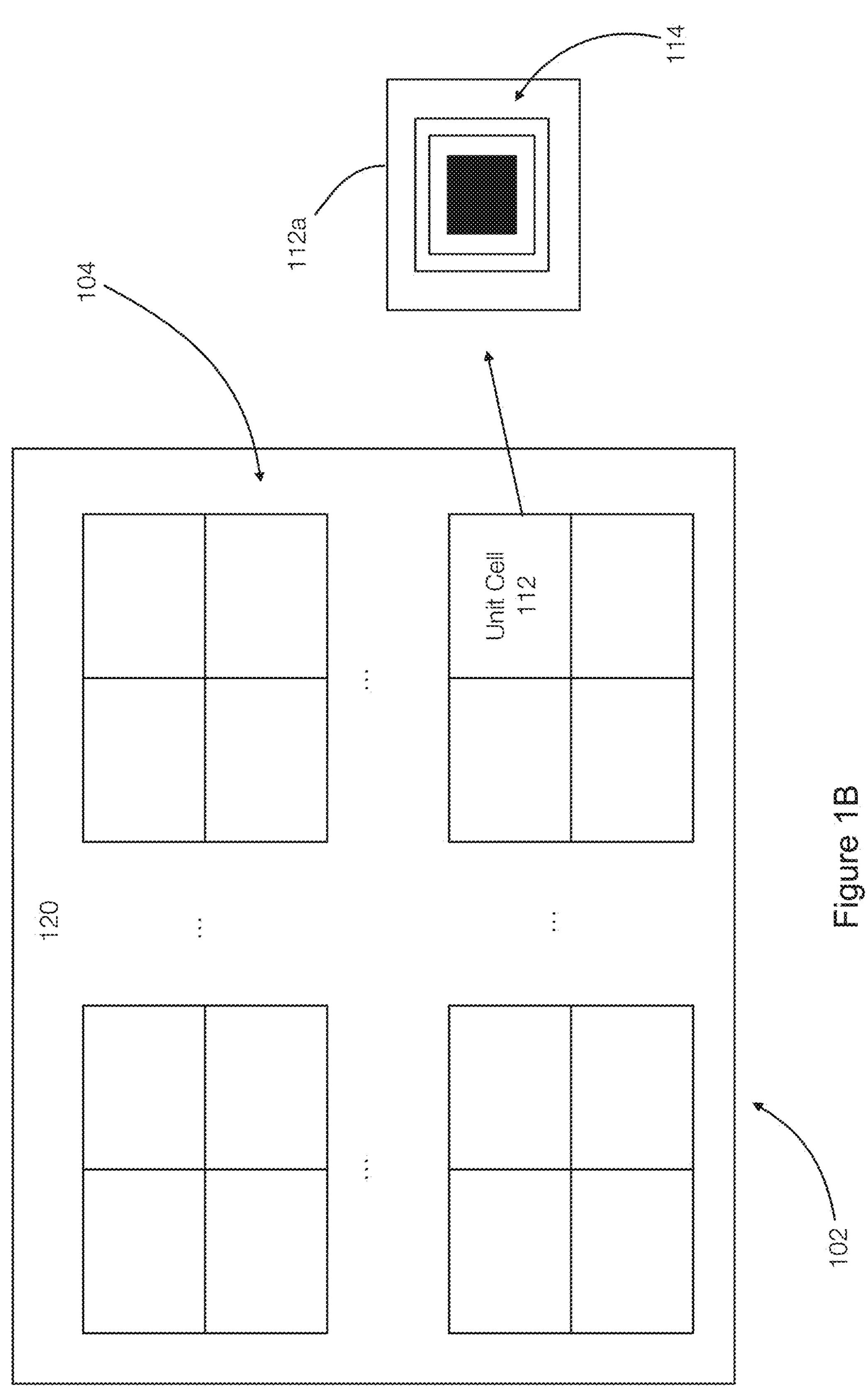
FIG. 1B discloses additional aspects of a reconfigurable intelligent surface system.

FIG. 1B discloses additional aspects of the metallic layer. FIG. 1B illustrates a top view 120 of the reconfigurable intelligent surface 102. The top view 120 illustrates an array 104 of unit cells, represented by the unit cell 112. An enlarged view 112*a* of the unit cell 112 illustrates a metallic pattern 114. The metallic pattern 114, in this example, includes a solid center portion surrounded by concentric rings. The metallic pattern 114 is sized, shaped or otherwise configured to provide resonance at a particular frequency. The metallic patterns 114 of unit cells in the array 104 may be the same or different. Generally, the metallic patterns are configured to generate constructive interference such that the incident beam is reflected in a particular direction. Changing the unit cells exposed or included in the aperture (e.g., by scrolling the surface 102) changes the reflection direction of the incident beam.

Figure 1C:
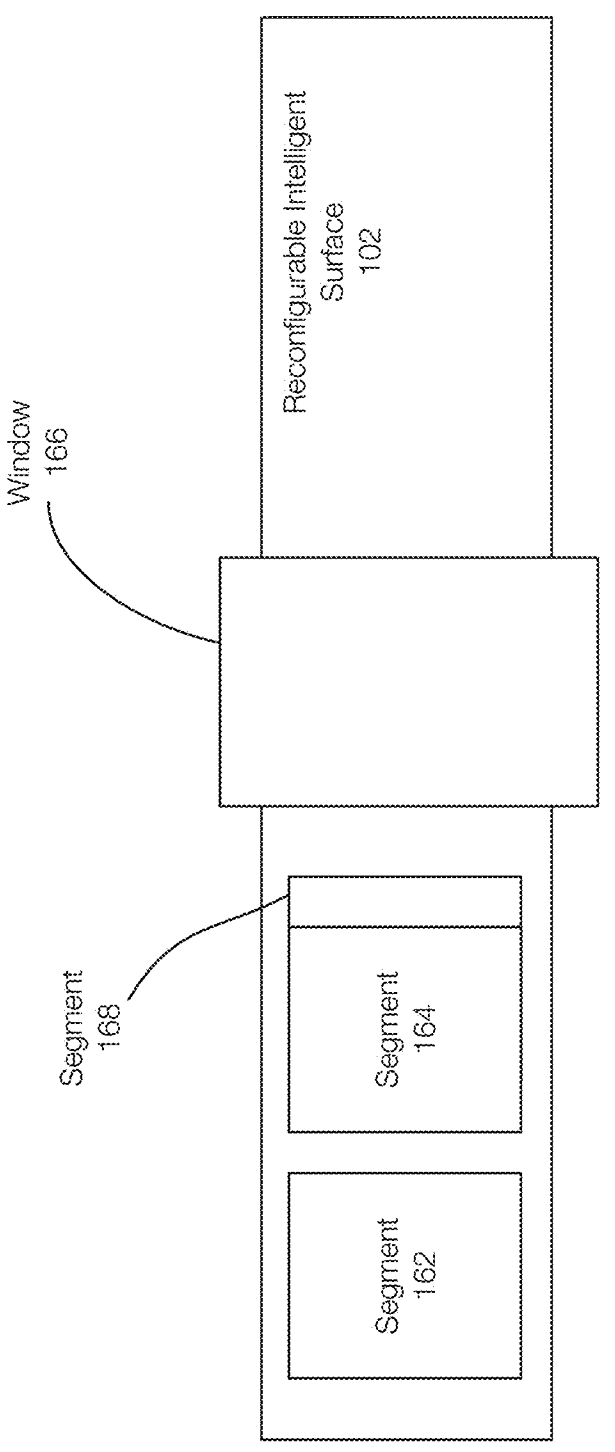
FIG. 1C discloses aspects of an aperture of a reconfigurable intelligent surface system.

FIG. 1C discloses aspects of selecting a segment of a reconfigurable intelligent surface to expose in a window or aperture. The reconfigurable intelligent surface 102 is configured to be scrolled as previously described using a tuning mechanism 108. The tuning mechanism 108 may be actuated to place the segment 162 in the illumination window 166. Thus, the aperture of the surface 102 is exposed in the illumination window 166. Similarly, the tuning mechanism 108 may move the segment 164 to be exposed in the window 166. In one example, only the portion or segment of the surface 102 exposed in the window 166 is operative or exposed to incident radiation. Further, the reflection characteristic of the segments 162 and 164 differ. Thus, the reflection direction associated with the segment 164 is different from the reflection direction associated with the segment 162. Scrolling the surface 102 through the window 166 performs beam scanning to select a desired reflection direction or beam. In addition, segments of the surface 102 may be completely separate or may overlap. For example, the segments 162 and 164 do not overlap while the segments 164 and 168 overlap. For example, the segment 168 and the segment 164 may each have at least one column of unit cells that is distinct while sharing other columns of unit cells.

Figure 1D:
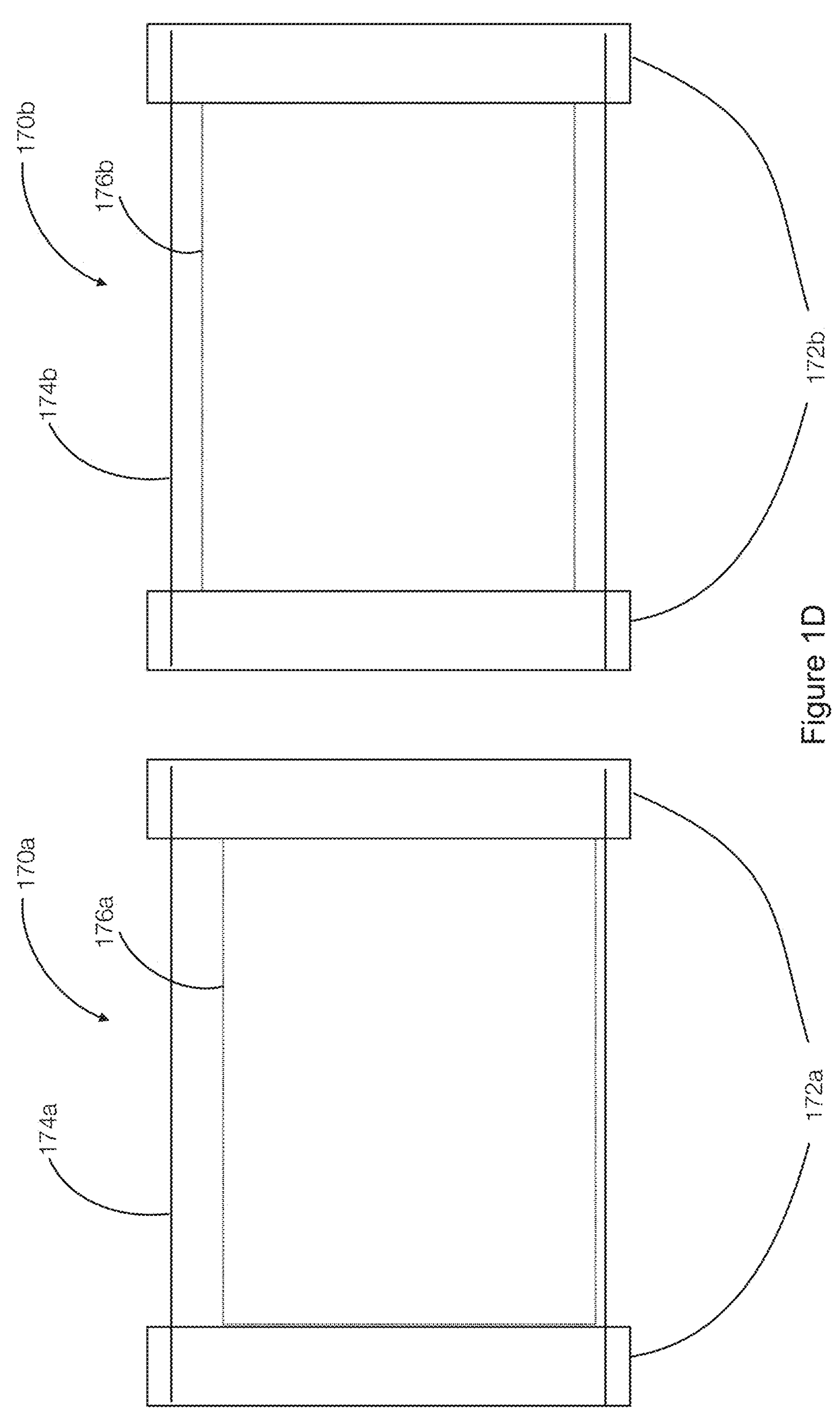
FIG. 1D discloses aspects of a device configured to reflect incident electromagnetic waves in at least two planes.

FIG. 1D discloses aspects of a device configured to reflect incident electromagnetic waves. FIG. 1D illustrates the same device in two different configurations. The device 170*a* includes a tuning mechanism 172*a*, a reconfigurable intelligent surface 174*a*, and an illumination window 176*a*. As described herein, the tuning mechanism 172*a* allows for one dimensional beam steering across either elevation or azimuth planes depending on orientation. In one example, a the illumination window 176*a* is configured to slide. The device 170*b*, which includes the surface 174*a*, the tuning mechanism 172*b*, and a window 176*b* illustrates that the window 176*b* can slide in a direction transverse to the scrolling direction. This may allow additional beam scanning in multiple dimensions. Thus, the window 176*a* or 176*b* may be mounted with a mechanism configured to slide.

Figure 2A:
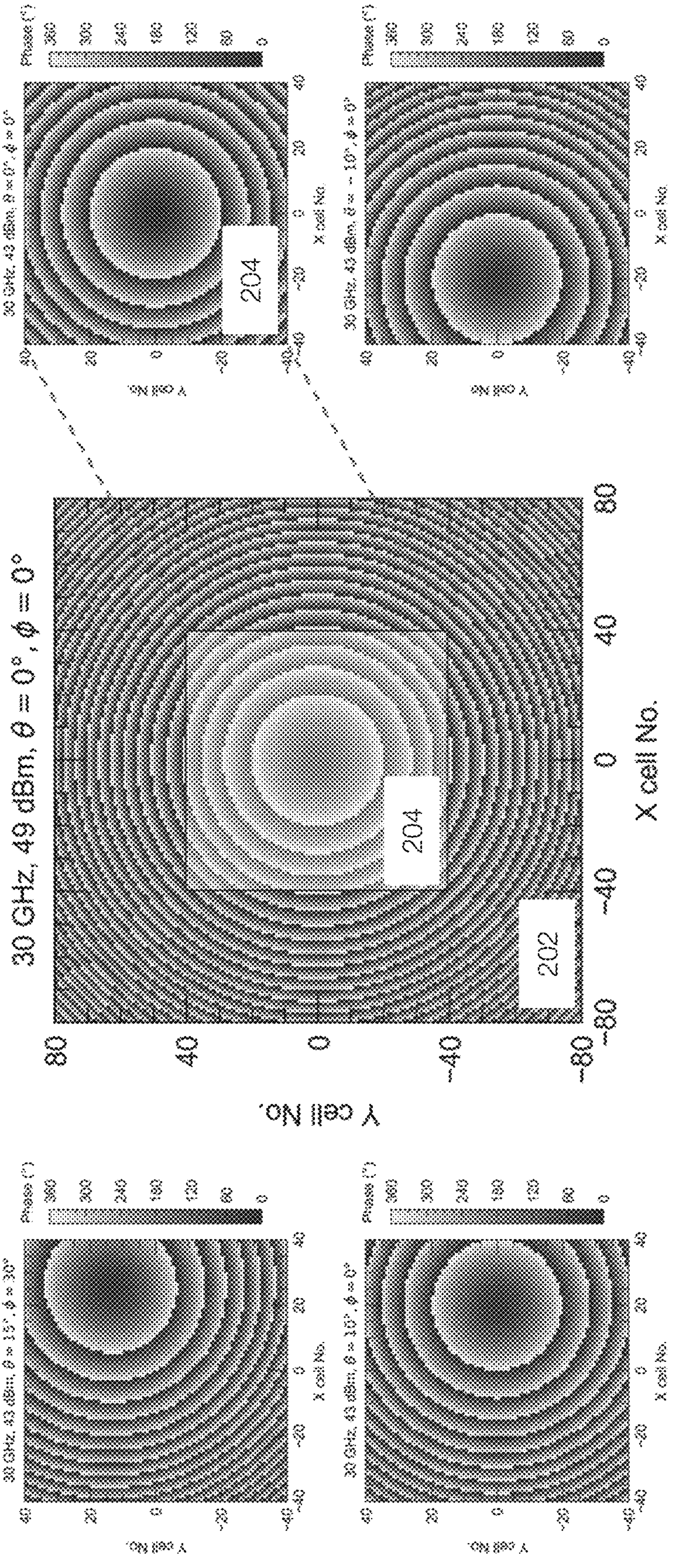
FIGS. 2A, 2B, 2C, 2D, and 2E disclose aspects of selecting a cropped window or an aperture of a reconfigurable intelligent surface.

FIG. 2A discloses aspects of a reconfigurable intelligent surface. FIG. 2A, more specifically, illustrates a reflective surface 202 for mmWave signals in this example. The surface 202 includes an array of unit cells printed or formed on a flexible substrate as previously described.

FIG. 2A illustrates, by way of example, a 160×160 array of unit cells of a reconfigurable intelligent surface. In this example, the surface 202 is configured to reflect a signal having a frequency of 30 Gigahertz with a gain of 49 dBm. The reflected beam direction depends on a phase profile of the reconfigurable intelligent surface 202. As previously stated, the reflection phase from each of the unit cells is selected or configured in a manner such that it provides constructive interference in the desired direction.

When a segment 204 from a central region of the surface 202 is selected (e.g., the segment 204 whose dimensions are 80×80 unit cells) and considered in isolation, a gain of 43 dBm is achieved in this example.

More generally, the dimensions of the reconfigurable intelligent surface may be influenced by the required gain and the beamwidth of the reflected beam. Panels or reconfigurable intelligent surfaces requiring higher gain and more directionally focused beams require a greater number of unit cells, which increases a size of the reconfigurable intelligent surface.

As previously stated, the reconfigurable intelligent surface 202 shown in FIG. 2A includes an array of 160×160 unit cells and provides a gain of 49 dBm in the broadside direction $\theta=0°$ and $\varphi=0°$. Reducing the number of unit cells to 80×80, such as in the segment 204, in the same broadside direction, the segment 204 offers a gain of 43 dBm in the direction $\theta=0°$ and $\varphi=0°$. The segment 204 thus represents a segment that may be exposed in an illumination window.

Figure 2B:
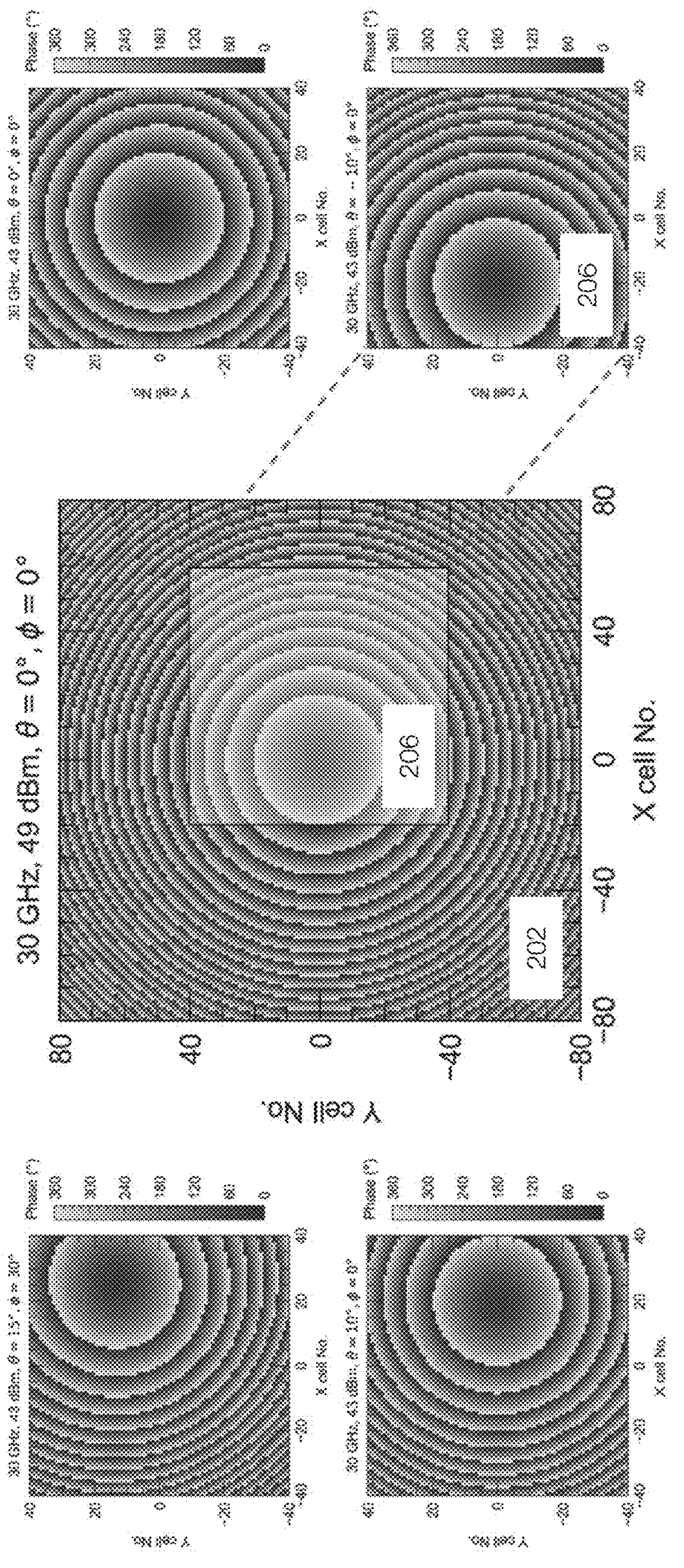

FIG. 2B discloses additional aspects of a reconfigurable intelligent surface. FIG. 2B illustrates a different segment 206 of the surface 202. In FIG. 2B, the segment 206 is shifted slightly to the right of the segment 204 in FIG. 2A or from a center of the surface 202. This results in an 80×80 reconfigurable intelligent surface (e.g., the segment 206) that offers a gain of 43 dBm in this example. In contrast to FIG. 2A, the reflected beam is directed in a direction of $\theta=-10°$ and $\varphi=0°$.

Figure 2C:
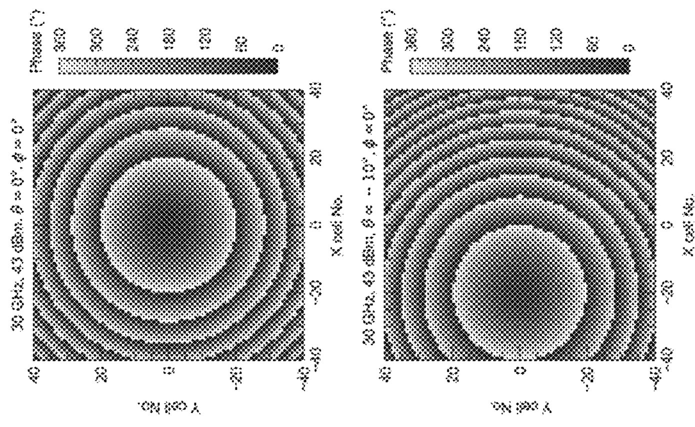
Figure 2C:
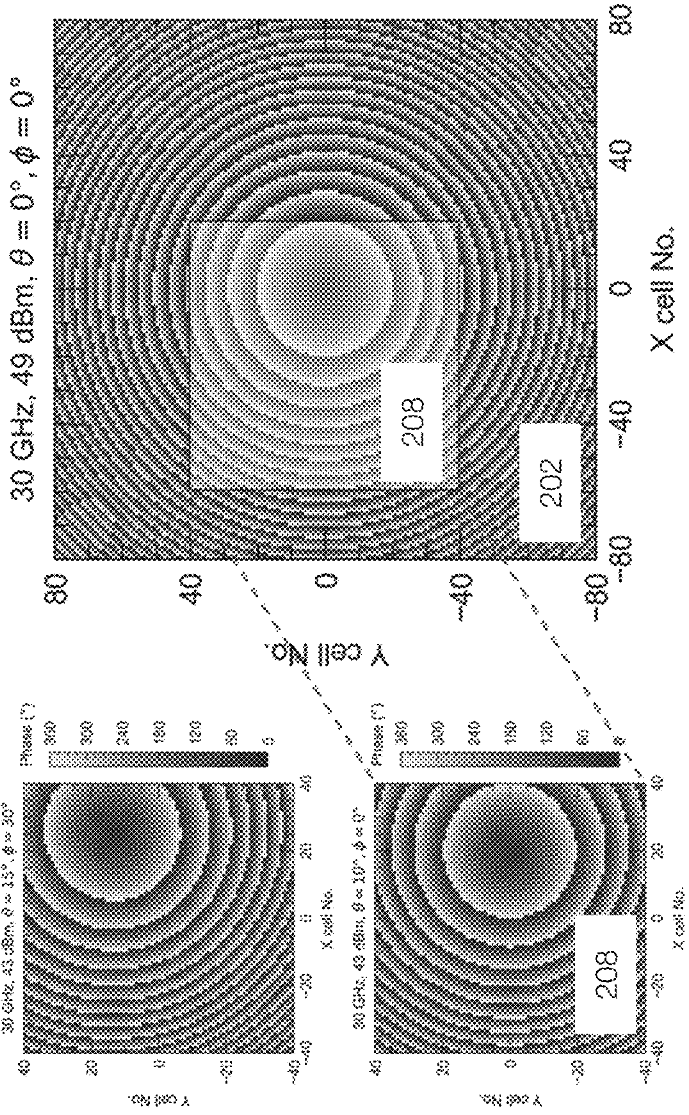

FIG. 2C discloses additional aspects of a reconfigurable intelligent surface. FIG. 2C illustrates that the segment 208 is at a position slightly to the left of the segment 204 and results in a reflected beam being directed in $\theta=10°$ and $\varphi=0°$, with a gain of 43 dBm.

Thus, FIGS. 2B and 2C illustrate that scrolling the surface 202 performs beam steering in two different directions. (or the X direction) based on exposing different segments 206 and 208.

Figure 2D:
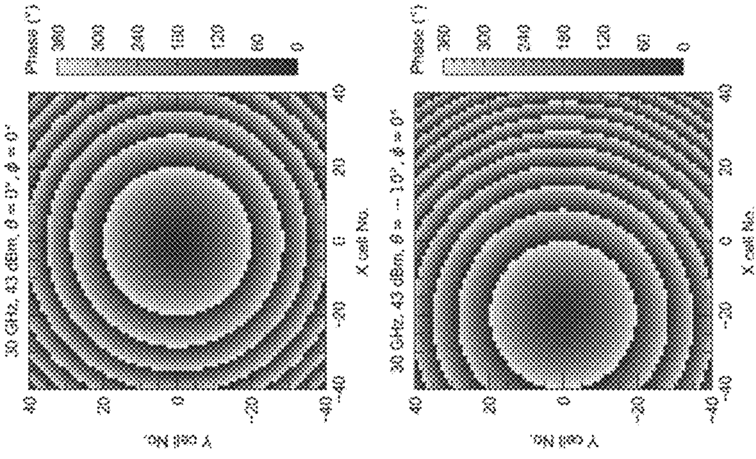
Figure 2D:
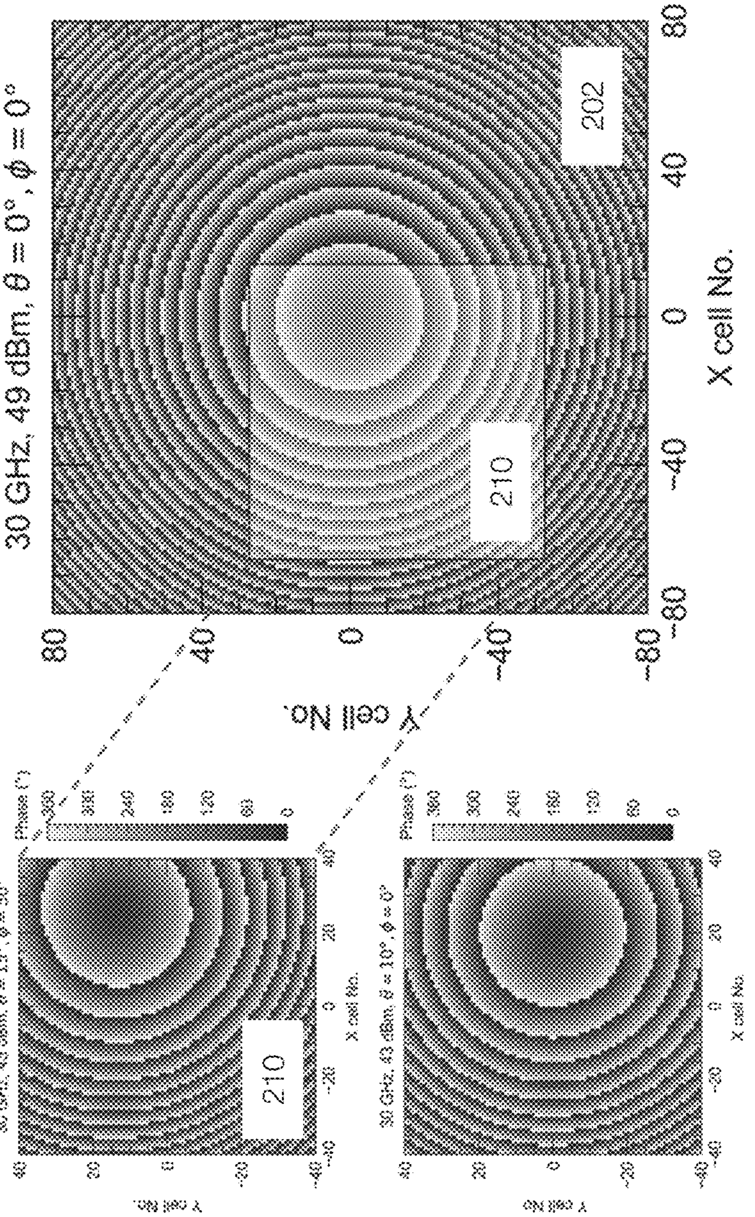

FIG. 2D discloses aspects of a reconfigurable intelligent surface and illustrates that the ability to steer a beam can be performed in both the $\theta$ and $\varphi$ directions. FIG. 2D illustrates a segment 210 that is moved in both X and Y directions relative to center or relative to the segment 204. When selecting the segment 210 for illumination, which may include operating the system such that the segment 210 is exposed in the illumination window, the segment 210 (the 80×80 reconfigurable surface in the segment 210) can redirect the beam in a direction of θ=15°, φ=30°.

Figure 2E:
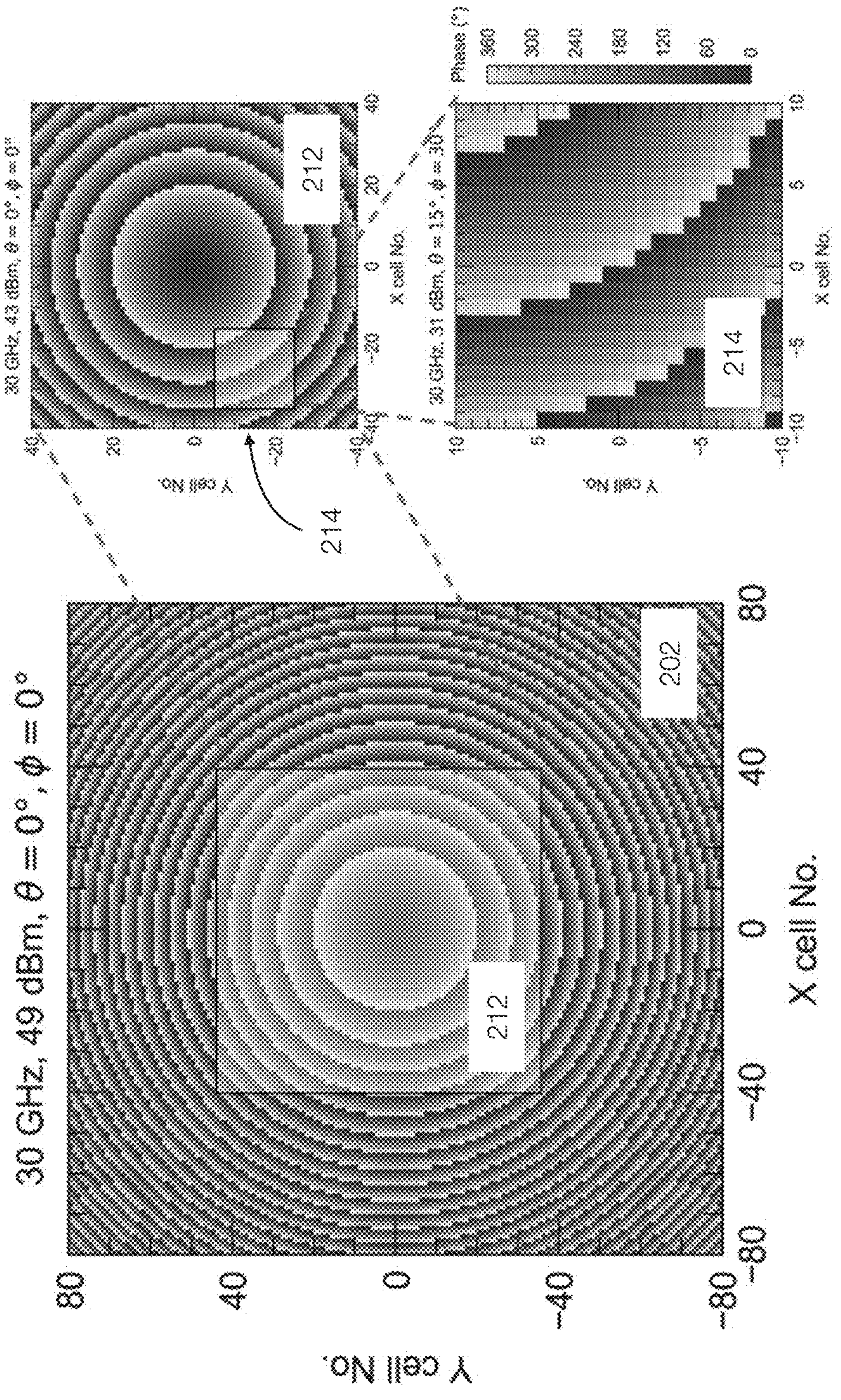

FIG. 2E discloses additional aspects of a reconfigurable intelligent surface. FIG. 2D illustrates that the approach of cropping the original surface (or selecting different sized segments) can be scaled more. In FIG. 2D, the segment 212 is a cropped portion of the surface 202. A second cropped segment 214 may be applied performed. In this example, the surface of the segment 212 has a gain of 43 dBm. The surface of the segment 214 offers a gain of 31 dBm in the direction θ=15°, φ=30°. In this example, the illumination window for the segment 214 may have a different size than an illumination window for the segment 212.

FIGS. 2A-2E illustrate that different portions or segments, of varying sizes, may be exposed in an illumination window. The size of the aperture (or segment) may impact the gain and the position of the selected aperture or segment relative to the surface 202 may determine the direction of the reflected beam. More specifically, the phase profile of one segment differs from the phase profile of another segment. Thus, different segments are associated with different reflection directions.

Figure 3:
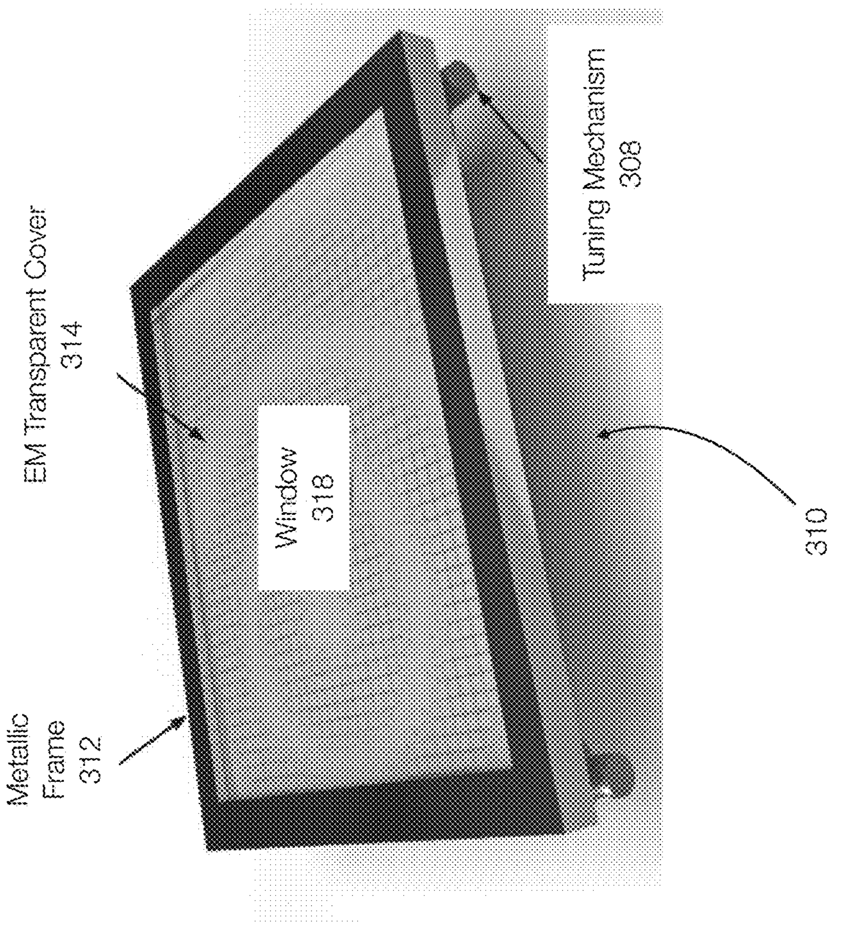
FIG. 3 discloses aspects of a reconfigurable intelligent surface system with and without a frame member.
Figure 3:
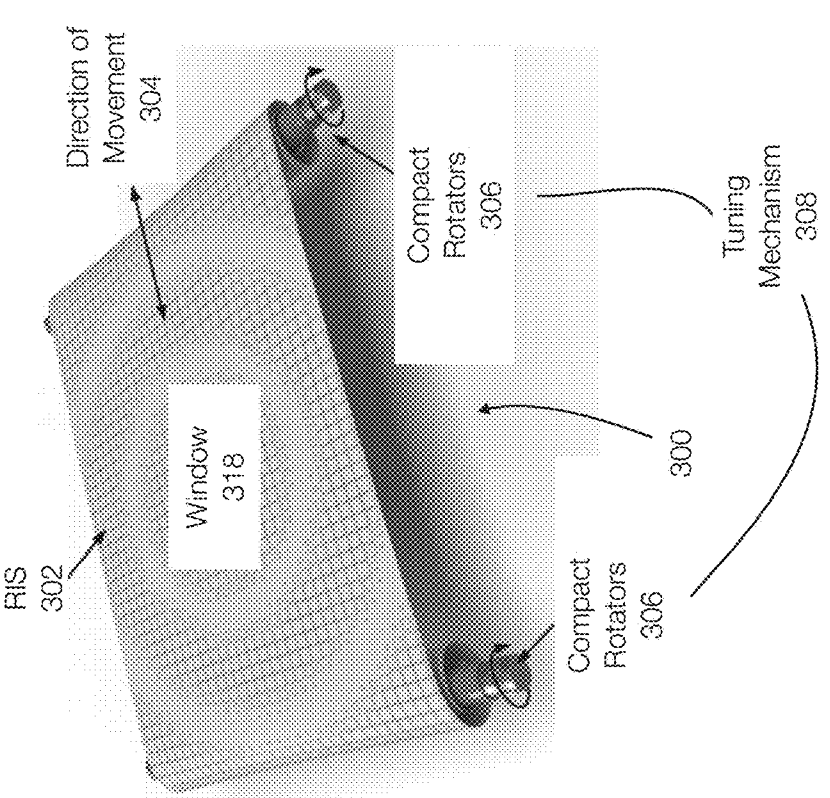

FIG. 3 discloses aspects of a reconfigurable intelligent surface system or panel. FIG. 3 illustrates a device 300 and a device 310. The devices 300 and 310 are identical except for the metallic frame 312 and the EM transparent cover 314. In effect, the device 310 is an example of the device 300 with a frame 312 and a cover 314. The device 300 (and the device 310) includes a reconfigurable intelligent surface 302 that includes an array of unit cells as previously described. In one example, the reconfigurable intelligent surface 302 is configured such that the surface 202 can be scrolled in at least one direction (e.g., −X and +X). Thus, the reconfigurable intelligent surface 302 is bendable or flexible and can be rolled up into a scroll form. As the tuning mechanism 308 is operated to scroll the surface 302, different segments are exposed in the illumination window 318. In FIG. 3, the surface 302 has been scrolled in the device 310 such that a different segment is exposed in the illumination window 318 of the device 310 compared to the segment exposed in the illumination window 318 of the device 300.

However, embodiments of the invention may operate without a frame as the rotating mechanisms are configured to scroll the reconfigurable intelligent surface such that a specific segment or portion is exposed to the incident signal. In this example, a segment of the surface is the portion of the surface exposed. Scrolling the surface may expose a different segment of the surface. In FIG. 3, the size of the aperture (or segment) of the device 300 is the same as the device 310. Thus, the segments or apertures are both exposed in the same illumination window 318 regardless of whether the frame 312 is present. However, the reflection direction for the device 300 and the device 310 are different because the specific segment exposed in the window 318 is different between the devices 300 and 310.

The device 300 includes a tuning mechanism 318 that may include a movement mechanism such as compact rotators 206 or rollers. Ends of the reconfigurable intelligent surface 302 are wrapped around compact rotators 306. Rotating the compact rotators 306, by the tuning mechanism 308, allows the reconfigurable intelligent surface 302 to be moved in the direction of movement 304 (e.g., X direction).

When a frame 312 (which may be metallic in one example) is added as shown in the device 310, a window 318 is formed that exposes a portion of the reconfigurable intelligent surface 302. The aperture of the surface 302 is the portion or segment exposed to the incident signals. An electromagnetic (EM) transparent cover 314 may be placed over the reconfigurable intelligent surface 302 to protect the reconfigurable intelligent surface 302 from damage. As previously stated, the illumination window 318 of the device 300 corresponds to the size of the segment exposed to incident signals. Thus, a frame is not required for operation.

In one example, the entire reconfigurable intelligent surface 302 may have a first gain. Once packaged such that only a portion of the reconfigurable intelligent surface 302 is exposed in the window 318, a smaller or second gain is typically realized.

Using the tuning mechanism 308, the phase profile of the portion of the reconfigurable intelligent surface 302 exposed in the window 318 determines the reflection direction of the incident beam or signal of interest. This example allows the reflected beam direction to be tuned in the θ direction. In one example, the tuning mechanism 308 allows scrolling only in the X direction. To achieve beam scanning in the θ and φ directions, the metallic pattern on the scroll can be adjusted or repositioned to select a segment that imparts beam scanning in the θ and φ directions. In another example, a first length of the scroll may be associated with a first φ, a second length of the scroll may be associated with a second φ, and the like. More specifically, actuating or operating the tuning mechanism 308 tunes the reflection direction by placing a different portion of the reconfigurable intelligent surface 302 in the window 318.

Figure 4:
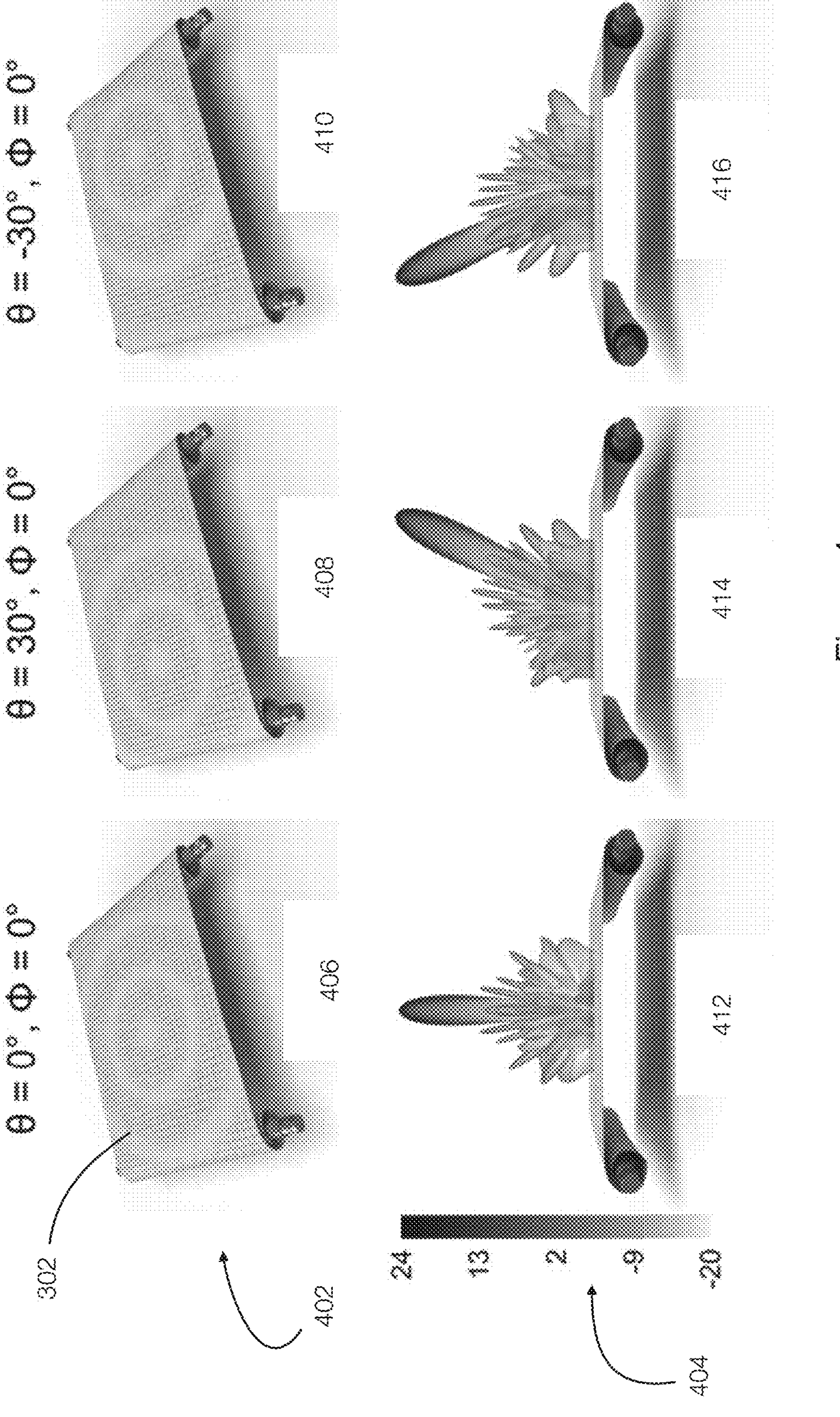
FIG. 4 discloses aspects of a redirected or reflected beam based on an exposed segment of the reconfigurable intelligent surface.

FIG. 4 discloses aspects of tuning a reconfigurable intelligent surface system. FIG. 4 illustrates that the tuning mechanism of a system (e.g., the device 300 or 310) has been actuated to expose different portions or segments 402 or, more specifically, segments 406, 408, and 410, of the reconfigurable intelligent surface 302 as an aperture or window. FIG. 4 illustrates reflection directions 412, 414, and 416, corresponding, respectively, to the exposed segments 406, 408, and 410 of the reconfigurable intelligent surface 302. Thus, the reflection direction 404 can be tuned by actuating the tuning mechanism to expose a specific segment or portion of the reconfigurable intelligent surface 302 in the aperture or window of the device 310. In one example, data is provided with phase response information or direction information such that the device 300 or 310 can be manually tuned to reflect in a specified direction.

Embodiments of the invention provide a system or panel that is configured to steer or reflect a beam or signal by selectively exposing specific segments or portions of a reconfigurable intelligent surface. Embodiments of the invention are capable of steering a high-gain beam without complex networks or mechanical systems. The ability to scroll a reconfigurable intelligent surface and selectively expose a segment thereof effectively provides multiple radiating apertures on a single flexible substrate and enables continuous beam scanning.

Beam defocusing can be achieved by adjusting the aperture's position, while maintaining the access point or base station in a stationary position. The aperture of a device may be shielded with the electromagnetic transparent cover 314, which allows for different types of customization. For example, a user may insert a photo in the frame such that the metallic pattern of the reconfigurable intelligent surface is hidden or concealed without impacting functionality. The tuning mechanism may also have a low profile and be discreetly positioned such that adjustments can be made when required. The tuning mechanism may be behind or inside the frame 312.

The tuning mechanism in one embodiment, which scrolls or otherwise positions the reconfigurable intelligent surface, allows for one dimensional beam steering across either elevation or azimuth planes depending on the mounting orientation of the device. When the aperture (or surface) rolls or is scrolled, the elements of the reconfigurable intelligent surface exiting the illumination window become inaccessible to the access point. The radiation pattern at each rolling position can be used to characterize each aperture's performance. Embodiments of the invention provide high directivity and beam-scanning capabilities in a simple, lightweight, and efficient manner. The reflected beam pattern and direction stays the same with or without enclosing the reconfigurable intelligent surface in a frame.

Figure 5:
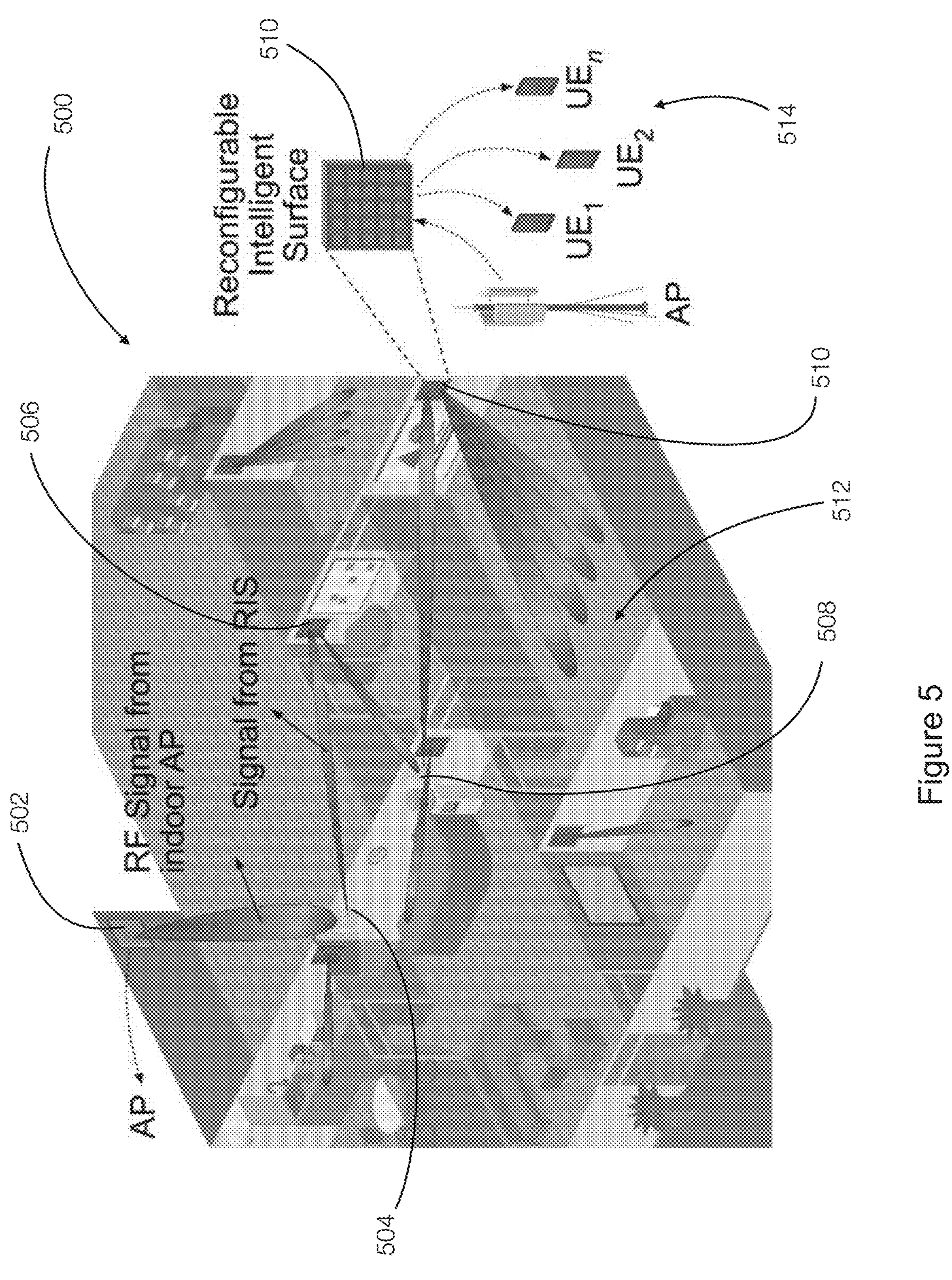
FIG. 5 discloses aspects of deploying a reconfigurable intelligent surface system in an indoor environment.

FIG. 5 discloses aspects of steering signals in an environment. FIG. 5 illustrates an environment 500, such as a working or indoor environment (e.g., a building) of an entity. The indoor environment 500 may be cluttered with many obstructions, including walls, furniture, and appliances, which can block or degrade wireless signals, such as mmWave signals. Reconfigurable intelligent surfaces (e.g., panels) can be strategically installed on walls, ceilings, or other surfaces, and can be used to reflect and steer these signals towards selected regions. As illustrated in FIG. 5, reconfigurable intelligent surfaces may receive a signal from the indoor access point and redirect the signal to areas where the signal, which is transmitted by the gateway 502 or router is weak or non-existent. Embodiments of the invention may be used in multi-story buildings to direct signals to upper or lower floors.

Reconfigurable intelligent surfaces not only improve the coverage but can also improve the security of wireless communications. By selectively directing signals, the possibility of eavesdropping is reduced. Reconfigurable intelligent surface can add an additional layer of physical security by enabling secure transmission zones where only intended receivers can intercept the signals. The passive beamforming from reconfigurable intelligent surface improves energy efficiency by reducing wasteful signal dispersion and directing the signal only where required. Embodiments of the invention can be extended to smart homes where reconfigurable intelligent surfaces can intelligently steer signals towards connected devices like smart speakers, smart TVs, IoT sensors, etc., even when these devices are located in hard-to-reach areas.

More specifically, a wireless network may be established and include an access point 502 for the environment 500. Embodiments of the invention use panels that include multiple unit cells to steer or direct the signals. By way of example, panels 504, 506, 508, and 510 may be placed at various locations in the environment 500 (other panels are also illustrated). To provide wireless network coverage in the room 512, which may not receive a signal from the gateway 502, the signal transmitted by the gateway 502 is transmitted to the panel 504. The panel 504 includes unit cells that are configured to direct or reflect the signal to the panel 506. More specifically, a particular aperture or segment of the reconfigurable intelligent surface is exposed to reflect the beam in the desired direction. The panel 506 is configure to direct or reflect the signal to the panel 508. The panel 508 is configured to direct or reflect the signal to the panel 510.

The panel 510 may be configured to direct or reflect the signal such that the signal can be directed to multiple user equipment 514 (e.g., $UE_1, \ldots, UE_n$), to provide wireless coverage to user equipment or other devices in the room 512 or other locations. A wireless path back to the access point 502 may be similarly configured.

Figure 6:
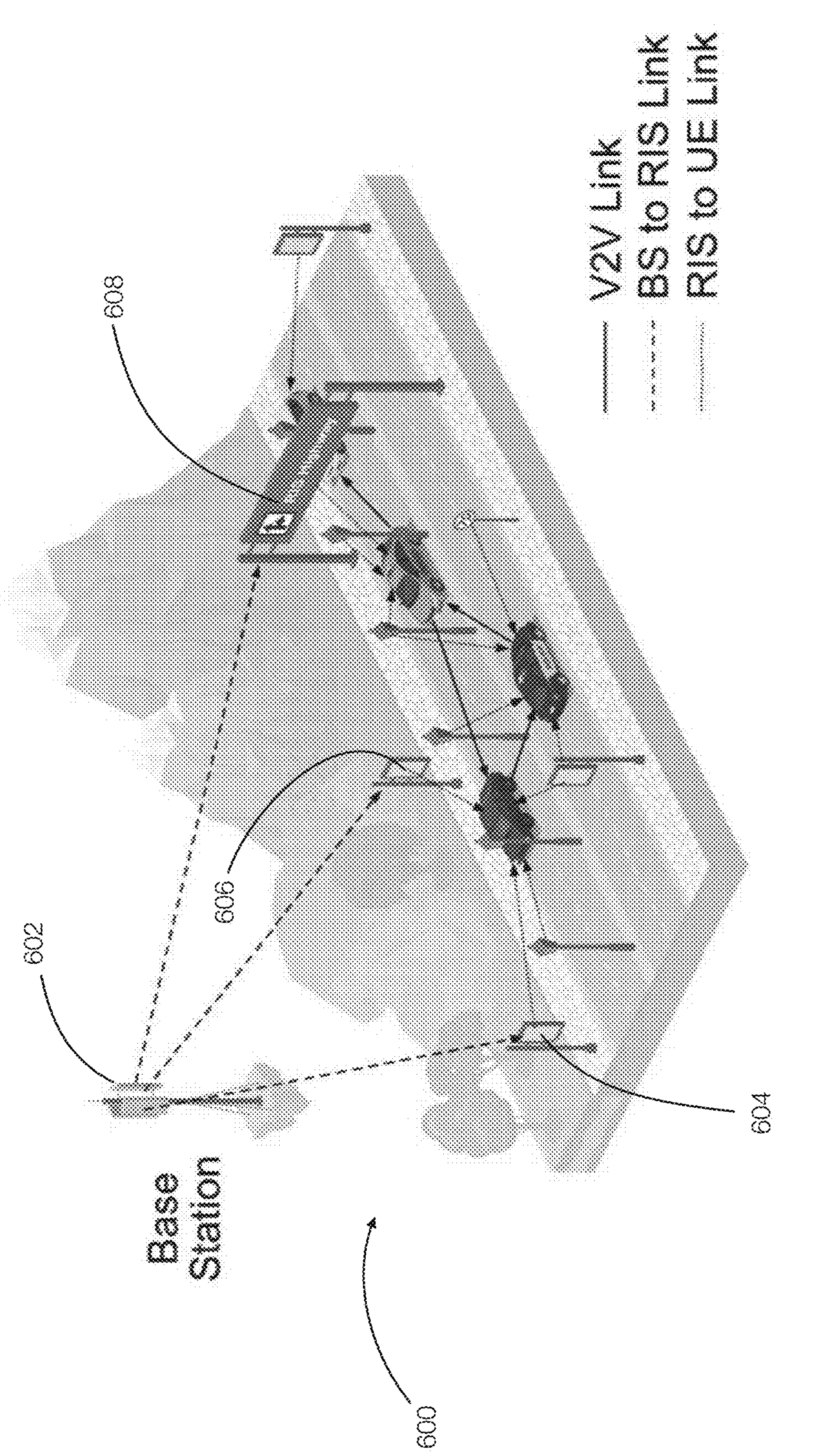
FIG. 6 discloses aspects of deploying a reconfigurable intelligent surface system in an outdoor environment.

FIG. 6 discloses aspects of an environment in which reconfigurable intelligent surfaces may be deployed. FIG. 6 illustrates an environment 600 such as a highway or road. In this example, a base station 602 may broadcast a signal that can be redirected by panels placed in the environment 600. In this example, panels 604, 606, and 608 may be placed on overhead signs, lamp posts, road signs, and the like. This allows the signals to be redirected or reflected to provide coverage in the environment 600. Vehicle-to-vehicle (V2V) communication may be enabled using embodiments of the invention. V2V and autonomous vehicles benefit from high-speed, reliable, and low-latency wireless communication. Due to its high data rates, mmWave technology is considered as a potential enabler for these vehicular communication applications. However, the propagation characteristics of mmWave signals can be a limiting factor as mentioned previously.

As illustrated in FIG. 6, panels can be deployed in specific locations to reflect and refract mmWave signals towards the intended vehicle or location, increasing the signal strength and improving the communication quality between vehicles. The coverage enhancement using reconfigurable intelligent surfaces is beneficial in vehicular networks as the vehicles may frequently go in and out of coverage areas. By extending the coverage of mmWave signals using reconfigurable intelligent surfaces, a smaller number of base stations and access points are needed. Reconfigurable intelligent surfaces can support Vehicle-to-Everything (V2X) communication, which involves communication between vehicles and any entity that may affect the vehicle, such as pedestrians, roadside infrastructure, or the network.

Figure 7:
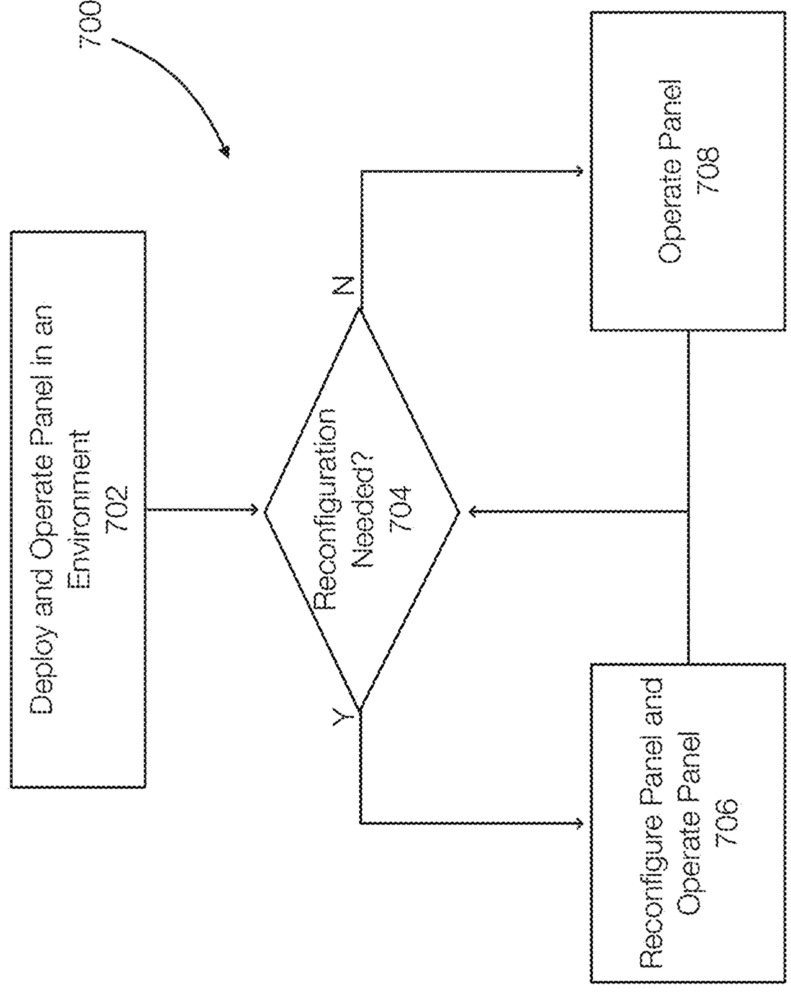
FIG. 7 discloses aspects of a method for operating a reconfigurable intelligent surface system.

FIG. 7 discloses aspects of a method for redirecting signals or electromagnetic waves in an environment. The method 700 may include deploying and operating 702 a panel (or multiple panels) in an environment or a network. When deploying a panel, the panel may be selected or configured based on the frequency or frequencies of the environment. For example, the configuration of the top metal layer of the unit cells may be selected based on the intended frequencies in the environment. As previously stated, the top metal layer of the unit cells is configured to be resonant with certain frequencies.

Aspects of the method 700 may be performed separately or as needed. Once a panel is deployed and operating, further changes may not be immediately necessary. In one embodiment, the panel may need to be reconfigured. Because the panel can redirect or reflect a signal in a continuous manner or be tuned in a continuous manner, the desired steering direction may change because of changes in the environment, operational failure of other panels, or the like. If reconfiguration is necessary (Y at 704), the panel is reconfigured and operation continues 706. If reconfiguration is not necessary (N at 704), the panel continues to operate 708. A panel may be reconfigured by scrolling the reconfigurable intelligent panel such that a different segment or portion of the reconfigurable intelligent panel is exposed in the window.

Panels can be arranged in different manners. For example, the unit cells of a specific panel can be configured to direct the incident signal in multiple directions (e.g., a portion of the unit cells are used for each direction). Alternatively, multiple panels may be used-one for each desired steering or reflection direction.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, signal processing operations, wireless coverage operations, signal steering or reflection operations, wireless coverage operations, or the like. More generally, the scope of the invention embraces any operating environment in which the disclosed concepts may be useful.

It is noted that any operation of any of the methods disclosed herein may be performed in response to, as a result of, and/or, based upon, the performance of any preceding operation. Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A device comprising: a reconfigurable intelligent surface that includes a flexible substrate, a first movement mechanism operatively connected with a first end of the flexible substrate, and a second movement mechanism operatively connected with a second end of the flexible substrate, wherein the first and second movement mechanisms cooperate to reposition the reconfigurable intelligent surface, wherein the reconfigurable intelligent surface, the first movement mechanism, and the second movement mechanism are arranged to selectively expose a segment of the reconfigurable intelligent surface in an illumination window.

Embodiment 2. The device of embodiment 1, wherein the reconfigurable intelligent layer further comprises a metallic layer formed on a surface of the flexible substrate, wherein the metallic layer comprises a plurality of unit cells.

Embodiment 3. The device of embodiment 1 and/or 2, wherein the unit cells are configured to each provide a phase response.

Embodiment 4. The device of embodiment 1, 2, and/or 3, wherein a phase response of the segment generates constructive interference to reflect a signal in a specific direction.

Embodiment 5. The device of embodiment 1, 2, 3, and/or 4, further comprising a frame that forms the illumination window.

Embodiment 6. The device of embodiment 1, 2, 3, 4, and/or 5, wherein the first and second movement mechanisms are configured to place the segment in the illumination window.

Embodiment 7. The device of embodiment 1, 2, 3, 4, 5, and/or 6, further comprising an electromagnetic cover positioned over the illumination window.

Embodiment 8. The device of embodiment 1, 2, 3, 4, 5, 6, and/or 7, wherein the first movement mechanism comprises a first roller and the second movement mechanism comprises a second roller.

Embodiment 9. The device of embodiment 1, 2, 3, 4, 5, 6, 7, and/or 8, wherein the first end is wrapped around the first roller and the second end is wrapped around the second roller.

Embodiment 10. The device of embodiment 1, 2, 3, 4, 5, 6, 7, 8, and/or 9, wherein the first roller and the second roller cooperate to scroll the reconfigurable intelligent surface in at least one direction.

Embodiment 11. The device of embodiment 1, 2, 3, 4, 5, 6, 7, 8, 9, and/or 10, wherein changing the segment exposed in the illumination window to a different segment changes a phase response of the device to a new phase response that corresponds to a different reflection direction.

Embodiment 12. The device of embodiment 1, 2, 3, 4, 5, 6, 7, 8, 9, 10, and/or 11, further comprising a controller configured to actuate the first movement mechanism to scroll in a first direction and actuate the second movement mechanism to scroll in a second direction.

Embodiment 13. The device of embodiment 1, 2, 3, 4, 5, 6, 7, 8, 9, 10, 11, and/or 12, further comprising a metallic layer printed on a surface of the flexible substrate, wherein the metallic layer comprises a pattern for each of the unit cells, the pattern is configured to be resonant with a frequency.

Embodiment 14. The device of embodiment 1, 2, 3, 4, 5, 6, 7, 8, 9, 10, 11, 12, and/or 13, wherein the metallic layer comprises copper.

Embodiment 15. The device of embodiment 1, 2, 3, 4, 5, 6, 7, 8, 9, 10, 11, 12, 13, and/or 14, wherein the flexible substrate comprises plastic, liquid crystal polymer, polyimide, or flexible glass.

Embodiment 16. A device comprising: a reconfigurable intelligent surface that includes a layer configured to reflect an electromagnetic signal and a flexible substrate, a tuning mechanism operatively connected with a first end of the reconfigurable intelligent surface and a second end of the reconfigurable intelligent surface, wherein the tuning mechanism is configured to reposition the reconfigurable intelligent surface with respect to an illumination window, wherein a phase response of a segment of the reconfigurable intelligent surface exposed in the illumination window determines a reflection direction of an incident signal.

Embodiment 17. The device of embodiment 16, wherein the tuning mechanism is configured to move the reconfigurable intelligent surface to provide beam scanning, wherein different segments of the reconfigurable intelligent surface have different phase responses.

Embodiment 18. The device of embodiment 16 and/or 17, wherein the tuning mechanism is configured with at least one movement mechanism configured to scroll the reconfigurable intelligent surface with respect to a first axis.

Embodiment 19. The device of embodiment 16, 17 and/or 18, wherein the reconfigurable intelligent substrate includes a plurality of unit cells each having a phase response, wherein the phase responses are configured to generate constructive interference to reflect the electromagnetic signal.

Embodiment 20. A system configured to direct an electromagnetic signal to an area comprising a plurality of devices according to one or more of the embodiments disclosed herein, wherein the devices are configured to reflect the electromagnetic signal is succession to the area.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A device comprising:

a reconfigurable intelligent surface that includes a flexible substrate and a two-dimensional array of unit cells distributed on the flexible substrate;

a first movement mechanism operatively connected with a first end of the flexible substrate; and a second movement mechanism operatively connected with a second end of the flexible substrate, wherein the first and second movement mechanisms cooperate to reposition the reconfigurable intelligent surface, wherein the reconfigurable intelligent surface, the first movement mechanism, and the second movement mechanism are arranged to selectively expose a segment of the reconfigurable intelligent surface in an illumination window, wherein the illumination window defines an aperture that is smaller than the reconfigurable intelligent surface such that only a subset of the unit cells is exposed to an incident signal, and wherein repositioning the reconfigurable intelligent surface changes which subset of the unit cells is included in the aperture to change a reflection direction of the incident signal.

2. The device of claim 1, wherein the reconfigurable intelligent layer further comprises a metallic layer formed on a surface of the flexible substrate, wherein the metallic layer comprises a plurality of unit cells.

3. The device of claim 2, wherein the unit cells are configured to each provide a phase response.

4. The device of claim 3, wherein a phase response of the segment generates constructive interference to reflect a signal in a specific direction.

5. The device of claim 1, further comprising a frame that forms the illumination window.

6. The device of claim 5, wherein the first and second movement mechanisms are configured to place the segment in the illumination window.

7. The device of claim 1, further comprising an electromagnetic cover positioned over the illumination window.

8. The device of claim 1, wherein the first movement mechanism comprises a first roller and the second movement mechanism comprises a second roller.

9. The device of claim 8, wherein the first end is wrapped around the first roller and the second end is wrapped around the second roller.

10. The device of claim 9, wherein the first roller and the second roller cooperate to scroll the reconfigurable intelligent surface in at least one direction.

11. The device of claim 10, wherein changing the segment exposed in the illumination window to a different segment changes a phase response of the device to a new phase response that corresponds to a different reflection direction.

12. The device of claim 1, further comprising a controller configured to actuate the first movement mechanism to scroll in a first direction and actuate the second movement mechanism to scroll in a second direction.

13. The device of claim 1, further comprising a metallic layer printed on a surface of the flexible substrate, wherein the metallic layer comprises a pattern for each of the unit cells, the pattern is configured to be resonant with a frequency.

14. The device of claim 1, wherein the metallic layer comprises copper.

15. The device of claim 1, wherein the flexible substrate comprises plastic, liquid crystal polymer, polyimide, or flexible glass.

16. A device comprising:

a reconfigurable intelligent surface that includes a layer configured to reflect an electromagnetic signal and a flexible substrate, the layer comprising a two-dimensional array of unit cells distributed on the flexible substrate;

a tuning mechanism operatively connected with a first end of the reconfigurable intelligent surface and a second end of the reconfigurable intelligent surface, wherein the tuning mechanism is configured to reposition the reconfigurable intelligent surface with respect to an illumination window, wherein a phase response of a segment of the reconfigurable intelligent surface exposed in the illumination window determines a reflection direction of an incident signal, wherein the illumination window defines an aperture smaller than the reconfigurable intelligent surface such that only a subset of the unit cells is exposed to the incident signal, and wherein beam scanning is achieved by repositioning the reconfigurable intelligent surface to expose different subsets of the two-dimensional array within the aperture.

17. The device of claim 16, wherein the tuning mechanism is configured to move the reconfigurable intelligent surface to provide beam scanning, wherein different segments of the reconfigurable intelligent surface have different phase responses.

18. The device of claim 16, wherein the tuning mechanism is configured with at least one movement mechanism configured to scroll the reconfigurable intelligent surface with respect to a first axis.

19. The device of claim 16, wherein the reconfigurable intelligent substrate includes a plurality of unit cells each having a phase response, wherein the phase responses are configured to generate constructive interference to reflect the electromagnetic signal.

20. A system configured to direct an electromagnetic signal to an area comprising a plurality of devices according to claim 16, wherein the devices are configured to reflect the electromagnetic signal is succession to the area.

* * * * *